(12) United States Patent
Herrmann et al.

(10) Patent No.: US 6,958,105 B2
(45) Date of Patent: Oct. 25, 2005

(54) AUTOMATED FABRICATION OF AN INTEGRAL FIBER REINFORCED COMPOSITE STRUCTURAL COMPONENT USING A POSITIONING AND ASSEMBLY SUPPORT

(75) Inventors: Axel Siegfried Herrmann, Peine (DE); Arno Pabsch, Braunschweig (DE)

(73) Assignee: Airbus Deutschland GmbH, Hamburg (DE)

( * ) Notice: Subject to any disclaimer, the term of this patent is extended or adjusted under 35 U.S.C. 154(b) by 213 days.

(21) Appl. No.: 10/638,277

(22) Filed: Aug. 8, 2003

(65) Prior Publication Data

US 2004/0050498 A1 Mar. 18, 2004

(30) Foreign Application Priority Data

Aug. 8, 2002 (DE) .................... 102 36 546
Jul. 11, 2003 (DE) .................... 103 31 358

(51) Int. Cl.$^7$ ............................................. B29C 70/44
(52) U.S. Cl. .................. 156/245; 156/285; 156/307.1; 264/511; 264/571
(58) Field of Search ................ 156/91, 92, 93, 156/148, 245, 247, 285, 286, 289, 306.6, 156/306.9, 307.1, 307.7, 344; 244/119, 123; 264/511, 571, DIG. 78; 425/504, 405.1, 388

(56) References Cited

U.S. PATENT DOCUMENTS

| | | | | |
|---|---|---|---|---|
| 5,135,382 A | * | 8/1992 | Tsuchiya et al. | 425/330 |
| 5,368,807 A | * | 11/1994 | Lindsay | 264/510 |
| 5,588,392 A | * | 12/1996 | Bailey | 114/357 |
| 6,306,239 B1 | * | 10/2001 | Breuer et al. | 156/245 |
| 6,869,561 B2 | * | 3/2005 | Johnson et al. | 264/510 |

* cited by examiner

Primary Examiner—John T. Haran
Assistant Examiner—Jayme L. Brown
(74) Attorney, Agent, or Firm—W. F. Fasse; W. G. Fasse (57) ABSTRACT

A forming jig includes a grid pattern of support walls arranged on a support base and having upper free ends located along an imaginary curved surface, and modular sectional profile members arranged on the walls to enclose a vacuum chamber within the jig. Grooves, channels and air passages between neighboring profile members communicate into the vacuum chamber. The outer surface of the profile members matches the intended inner surface of a structural component to be fabricated using the jig. In the fabrication process, a film is applied to the outer surface to pre-establish a vacuum, the film is removed while simultaneously a vacuum skin is applied, stringer members are set into the grooves, fiber skin layers are laid up, a sealant is applied around the perimeter, a structural shell is vacuumed onto the skin layers, and then this preformed component is removed from the jig, injected with resin unless the skin layers were pre-impregnated with resin, and cured.

6 Claims, 9 Drawing Sheets

AUTOMATED FABRICATION OF AN INTEGRAL FIBER REINFORCED COMPOSITE STRUCTURAL COMPONENT USING A POSITIONING AND ASSEMBLY SUPPORT

PRIORITY CLAIM

This application is based on and claims the priority under 35 U.S.C. §119 of German Patent Applications 102 36 546.6, filed on Aug. 8, 2002 and 103 31 358.3, filed on Jul. 11, 2003, the entire disclosures of which are incorporated herein by reference.

FIELD OF THE INVENTION

The invention relates to an apparatus or system including a positioning and assembling or fabricating support (or so-called forming jig), as well as a method for carrying out the automated fabrication of an integral structural component made of a fiber reinforced composite material for high performance or high strength applications, for example preferably a structural shell strengthened with stringers arranged at prescribed spacing distances, for use in the construction of an aircraft fuselage.

BACKGROUND INFORMATION

High performance and high strength fiber reinforced composite materials are predominantly processed by means of a vacuum bag method for fabricating various lightweight structural components therefrom, for example composite structural shell components for use in the manufacture of aircraft fuselages. With such a vacuum bag fabrication method, considerable quality risks arise, especially in connection with the fabrication of integrally stiffened structures such as fuselage shell structures, due to the manual positioning of the individual structural elements and the manual application of a vacuum skin as well as the manual sealing thereof. Each manual step in the process suffers a significant risk of inaccurate or inconsistent positioning and arranging of the several elements. That results in an increased reject rate, reduced strength, and/or increased tolerance variations of the finished structural components. An automated fabrication of structural components using such a vacuum bag technique is not possible.

SUMMARY OF THE INVENTION

In view of the above, it is an object of the invention to provide a positioning and assembly support or forming jig that enables the automated fabrication of an integral structural component made of fiber reinforced composite materials for high performance or high strength applications, for example such as a structural shell strengthened or reinforced with stringers arranged at prescribed spacing distances for the manufacture of aircraft fuselages. It is another object of the invention to provide such an automated method without using a vacuum bag technique, while ensuring highly accurate automatic positioning and arrangement of the various elements going into the fabrication of the structural component. The invention further aims to avoid or overcome the disadvantages of the prior art, and to achieve additional advantages, as apparent from the present specification.

The above objects have been achieved according to the invention in a system or apparatus for carrying out the automated fabrication of fiber reinforced composite structural components. According to the invention, the system or apparatus includes a flat planar elongated support base with a grid of at least two support walls protruding upwardly from and secured to the support base. The support walls respectively have different lengths, or different protrusion heights from the support base, whereby the upper free ends (i.e. the upwardly directed faces or edges) of the several support walls lie along an imaginary curved arcuate surface. The several support walls extend from the support base at various different angles respectively depending on or defined by the radius of curvature of the imaginary curved arcuate surface, whereby particularly each support wall preferably is oriented perpendicular to the imaginary curved surface locally at the free end of the respective support wall. The system or apparatus further includes plural modular sectional profile members mounted and secured on the upper free ends of the support walls, so as to extend along the imaginary curved surface, which means that the imaginary curved surface extends along an actual surface of, or through the body of, or proximately along, the modular sectional profile members. Thereby, the profile members cover respective hollow interspaces between neighboring ones of the support walls to form a vacuum chamber or chambers. The outer upper surfaces of the modular sectional profile members are shaped and configured to match the desired finished inner contour of a curved integral structural component that is to be fabricated using this apparatus.

According to further preferred details of the invention, the joints or gaps between respective adjacent ones of the modular sectional profile members are respectively aligned on the upper free ends of the support walls, and will also correspond with the intended positions of respective stringers that will be provided to strengthen the structural component being fabricated. The upper edges of the modular sectional profile members are tapered, chamfered, rabbeted or grooved to form sectional grooves extending therealong between the neighboring modular sectional profile members, and these grooves communicate into channel-shaped recesses that are further formed between the respective neighboring modular sectional profile members. Air inlet slots or slits in the bottom edges of the profile members pass from this area into the interspaces or chambers between the adjacent supporting walls. A perimeter channel or groove filled with an air permeable material extends around the entire perimeter of the upper outer surface formed by the plurality of modular sectional profile members. As will be described below, the reinforcing or strengthening stringers can be laid into and along the sectional grooves and channel-shaped recesses for accurately positioning the stringers, and the fiber composite materials can be arranged or laid onto the upper surface of the modular sectional profile members in a vacuum-tight manner, for fabricating the fiber reinforced composite structural component in an automated manner.

Through the use of the positioning and assembly support according to the invention, having defined reference contours facing toward and cooperating with a molding tool, the invention advantageously ensures that all of the structural elements being used to fabricate the structural component are necessarily precisely positioned and then fixed in defined positions in a positively enforced manner. Thereby, an automated locating of the structural elements in a structural shell is advantageously achieved.

The above objects have further been achieved according to the invention in a method for the automated fabrication of a structural component such as an integral structural shell of fiber reinforced composite materials that is strengthened with stringers arranged at prescribed spacing distances, for high strength or high performance applications, using the above described positioning and assembly support or forming jig. The inventive method includes the following steps:

a) the upper outer surface of the modular sectional profile members circumscribed by the perimeter channel is covered with a loose film or foil that lies loosely thereon;

b) the hollow chamber formed by the interspaces between the supporting walls is evacuated with a vacuum, so that the film or foil is sucked onto the overall upper outer surface of the modular sectional profile members due to the vacuum communication through the perimeter channel and the air inlet slits or slots;

c) after a sufficient vacuum level is achieved, the film is once again removed by being rolled up onto a film supply roll, while simultaneously a vacuum skin is unrolled onto the outer surface of the modular sectional profile members so that the vacuum skin is vacuumed or sucked in a form-fitting manner onto the outer surface and into the sectional grooves and the channel-shaped recesses of the modular sectional profile members, whereby, for example, the film supply roll and the vacuum skin supply roll may be coupled to each other;

d) stringer sectional members provided with support or strengthening elements are laid into the sectional grooves that have been lined by the vacuum skin;

e) skin layers of reinforcing fibers (either "dry" or pre-impregnated with resin) are laid-up on the vacuum skin and on the stringer sectional members that have been arranged on the outer surface of the modular profile sectional members in the preceding steps;

f) a sealing mass, i.e. a mass of a sealant material, is applied in an optimal quantity onto the upper surface of the vacuum skin, and particularly around the perimeter of the skin layers;

g) a pre-formed curved structural shell with its concave curvature facing downward is laid onto the skin layers and the sealing mass, and the circumscribing sealing mass is compressed in such a manner so as to achieve a vacuum-tight perimeter seal between the vacuum skin and the structural shell while also enclosing and forming a cavity between the vacuum skin and the structural shell, whereby this cavity is evacuated by the vacuum applied through the interspaces or vacuum chamber of the positioning and assembly support;

h) after reaching the intended or desired process vacuum in the cavity between the vacuum skin and the structural shell, the application of the vacuum to the hollow chamber formed by the interspaces of the positioning and assembly support is interrupted and released, and the hollow chamber is opened or vented to the atmosphere; and i) the structural shell is lifted up away from the positioning and assembly support, rotated or "flipped over" by 1800 so that the concave curvature faces upwardly, and is then injected with resin (if not already pre-impregnated) and cured, for example in an autoclave.

An advantage of the inventive method is achieved by the uniform and substantially tension-free pre-forming of the vacuum film in a defined reference position on the outer forming surface of the forming jig, such that a vacuum can be pre-established, and then the actual vacuum skin of the component to be fabricated can be applied in a form-fitting manner onto the outer forming surface of the forming jig while simultaneously removing the temporary film, and thereby maintaining the vacuum. This achieves an accurate positioning and forming of the vacuum skin on the forming surface and in the sectional grooves of the jig, which further enables the accurate automated positioning and placement of the stringers in the grooves relative to the structural shell, and also enables an automatic sealing of the accurately positioned structural elements in a fully automated or substantially automated process.

BRIEF DESCRIPTION OF THE DRAWINGS

In order that the invention may be clearly understood, it will now be described in connection with an example embodiment relating to the fabrication of an integral structural shell of fiber reinforced composite materials strengthened with stringers at prescribed spacing distances or intervals, for high performance applications such as the manufacturing of an aircraft fuselage, through the use of a positioning and assembly support. This description will make reference to the accompanying drawings, wherein.

DETAILED DESCRIPTION OF A PREFERRED EXAMPLE EMBODIMENT AND OF THE BEST MODE OF THE INVENTION

Figure 1:
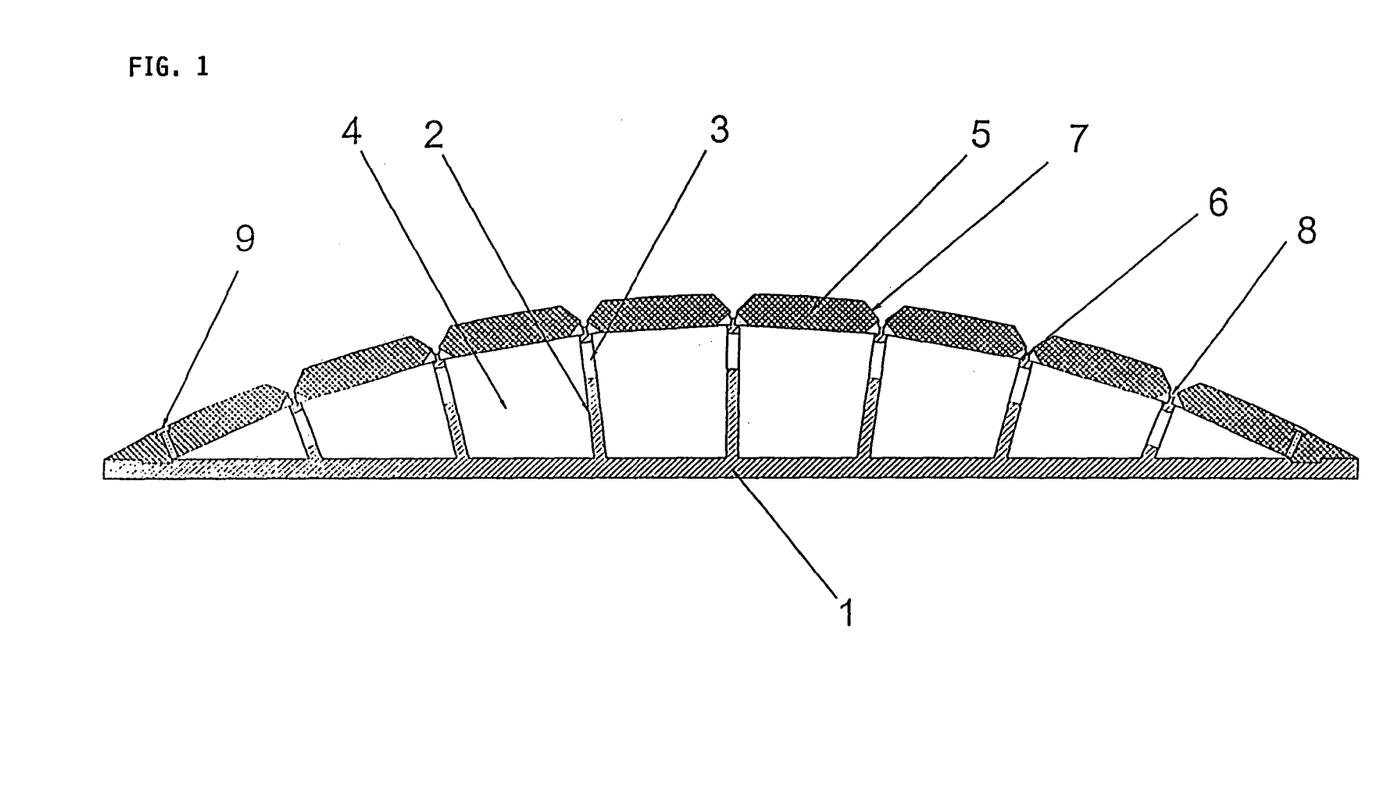
FIG. 1 is a schematic vertical sectional view of the general construction of a positioning and assembly support or forming jig according to the invention, for the automated fabrication of an integral structural component of fiber reinforced composite materials for high performance applications.

The forming jig or positioning and assembly support shown in FIG. 1 includes a flat planar and elongated support base 1 that is solid and vacuum-tight all the way out to its lateral edges. A plurality of supporting walls 2 (e.g. in the present example seven supporting walls 2) of respective different lengths or protruding heights from the support base 1 are arranged and secured on the support base 1 so as to protrude generally upwardly therefrom while forming a grid of the walls 2 on the base 1. The support base 1 and the support walls 2 are preferably made of metal, for example a light metal or metal alloy, and the support walls 2 may be welded onto the support base 1, for example. The upper free ends of the support walls 2 all lie on a curved or arcuate imaginary surface that generally corresponds to the curvature of the structural component that is to be fabricated. The respective support walls 2 each protrude respectively at a different angle from the support base 1, whereby this angle for each support wall 2 is dependent on the radius of the curved imaginary surface, for example so that each support wall 2 extends perpendicularly to the curved imaginary surface at the free end of the respective support wall 2.

The support walls 2 are each provided with openings or through holes 3 that interconnect the interspaces 4 between neighboring ones of the support walls 2, to form thereof a hollow chamber acting as a vacuum chamber as will be described below. Modular sectional profile members 5 are arranged and supported on the upper free ends of the support walls 2 along the curved imaginary surface, so as to respectively cover the interspaces 4 between each pair of neighboring support walls 2. The upper edges of the upper free ends of the support walls or the lower edges of the modular sectional profile members can be rabbeted so that the profile members are somewhat spaced apart from one another and seated on the upper ends of the walls. The modular sectional profile members 5 are preferably made of a light material, such as a light metal alloy, aluminum, steel, or a composite, which is machinable to the appropriate configuration by a CNC machining process. The outer surfaces of the modular sectional profile members are shaped or configured to match the desired inner contour of the inner concavely curved surface of the integral structural component that is to be fabricated.

The modular sectional profile members 5 are arranged with gaps therebetween running along the upper free ends of the support walls 2, whereby the modular profile sectional members 5 are provided with air inlet slots or slits 6 along the lower edges thereof so as to provide an air communication into the interspaces 4 therebelow. Furthermore, the modular sectional profile members 5 arranged along the perimeter and directly adjoining the support base 1 are further provided with a circumscribing perimeter channel 9 that extends entirely and continuously around the perimeter of the upper forming surface of the modular sectional profile members. The perimeter channel 9 is filled or inlaid with a highly air permeable or porous material, such as sponge rubber, open-celled foam, fleece material, porous metal, porous ceramic, or other air permeable materials, and the bottom of the channel 9 is brought into communication with the interspaces 4 through a plurality of bored holes. Alternatively, suction cups can be provided to hold the perimeter of the vacuum skin.

As mentioned above, the joints or gaps between neighboring ones of the modular sectional profile members 5 are arranged directly along the upper ends of the support walls 2, which also correspond to the intended positions of stringers of a stringer strengthened structural shell that is to be fabricated. Further for this purpose, sectional grooves 7 are milled as chamfers, tapers, rabbets or grooves into (or otherwise formed in) the upper edges of the modular sectional profile members 5, and these sectional grooves 7 further communicate into respective additional channel-shaped recesses 8 along and between neighboring ones of the modular sectional profile members 5. Each channel-shaped recess 8 thus bottoms onto the underlying upper free end of the associated support wall 2, and is configured to avoid any undercut of the sidewalls relative to a line perpendicular to the curved forming surface, so as to avoid trapping or holding material therein during the inventive fabrication process. The sectional grooves 7 and the channel-shaped recesses 8 are dimensioned, configured and positioned to correspond to the dimensions and positions of the stringers that are to be provided in the fabrication of the structural component.

The sequence of method steps for fabricating an integral structural shell of fiber reinforced composite materials, strengthened by stringers provided at defined spacing intervals, will now be described in detail in connection with FIGS. 2 to 9.

Figure 2:
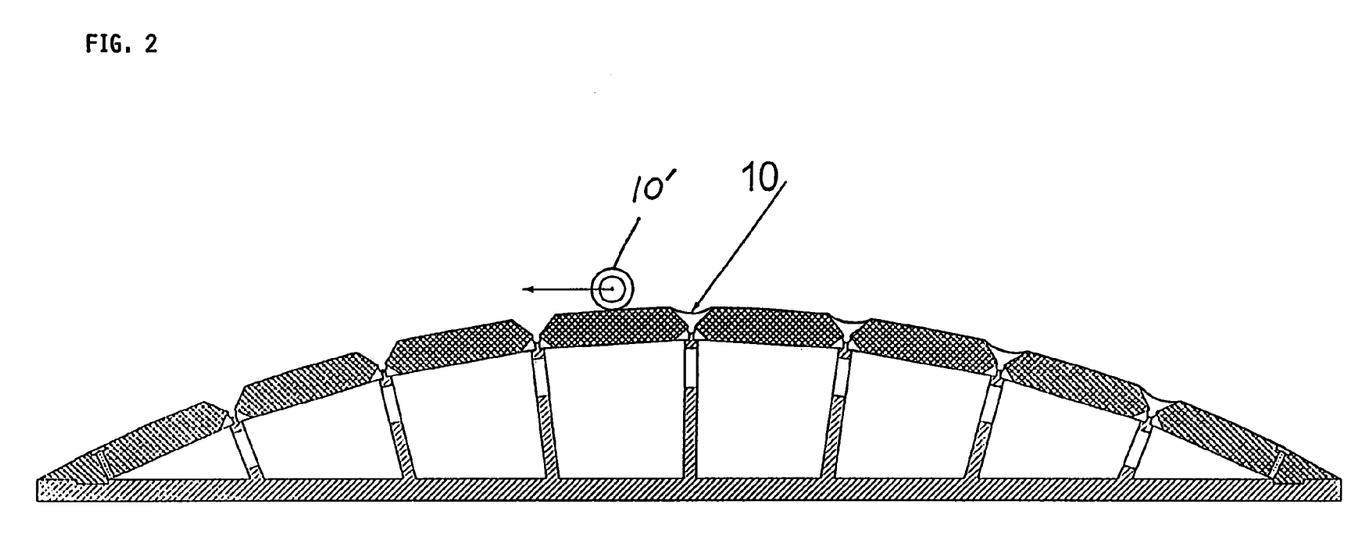
FIG. 2 is a schematic sectional view similar to FIG. 1, but showing a first process step in which a film is temporarily applied onto the forming jig to establish a vacuum therein.

As shown in FIG. 2, in a first step of the process, an outer forming surface of the modular sectional profile members 2 that is circumscribed by the perimeter channel 9 is loosely covered with a film 10 by unrolling the film 10 from a film supply roll 10', so that the film 10 loosely lies on the outer forming surface. This film 10 may, for example, be made of any one or more of various polyamides.

Figure 3:
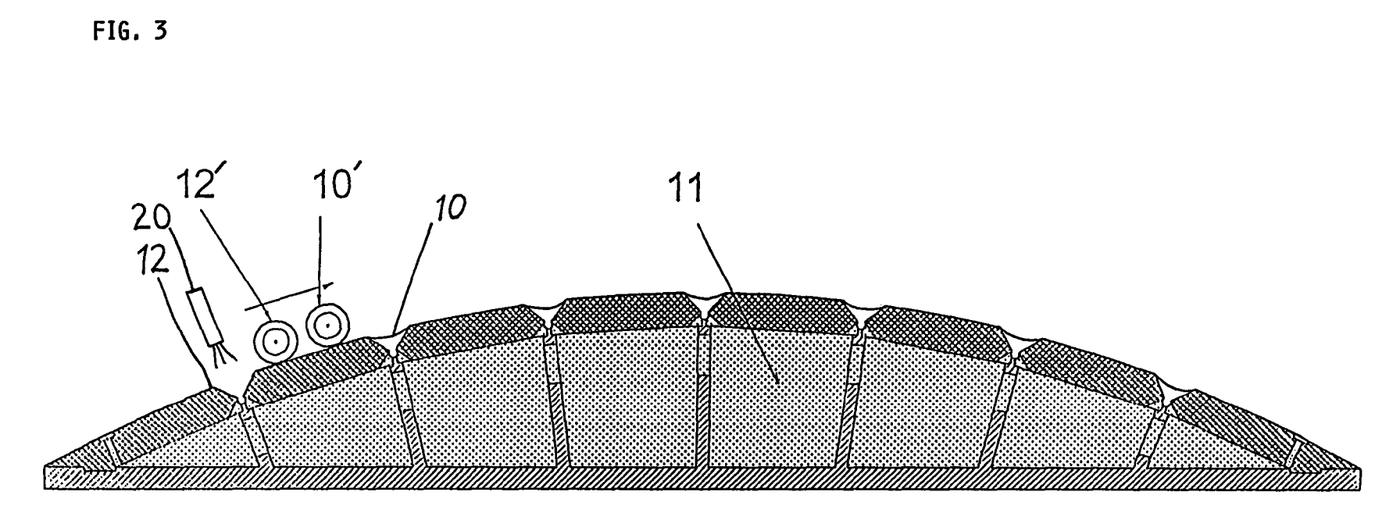
FIG. 3 shows a subsequent process step in which the film is removed while a vacuum skin is simultaneously applied onto the forming jig.

Next, as shown in FIG. 3, the hollow vacuum space formed by the interconnected interspaces 4 is evacuated, i.e. has a vacuum 11 (represented by stippled dots in the interspaces 4) applied thereto from a vacuum source (not shown) so that the film 10 is sucked against the outer forming surface of the modular sectional profile members 5 and somewhat into the sectional grooves 7, due to the suction or vacuum communicated through the air inlet slits or slots 6, and by the perimeter suction provided through the perimeter channel 9. Then, after a sufficient vacuum has been achieved, the film 10 is removed from the forming surface by being again rolled-up onto the film supply roll 10', while simultaneously the actual vacuum skin 12 of the structural component to be formed is unrolled from a vacuum skin supply roll 12' onto the outer forming surface of the modular sectional profile members 5. Particularly, the vacuum skin supply roll 12' follows the film supply roll 10' at a close distance so that the vacuum skin 12 is unrolled and applied onto the forming surface immediately following the removal of the film 10 from the forming surface. This can be achieved, for example, by coupling together the two rolls 12' and 10'. By unrolling and applying the vacuum skin 12 with a minimal tension and minimal counterforce, this ensures that the vacuum skin 12 will be vacuumed against the outer forming surface of the modular sectional profile members 5 and into the sectional grooves 7 and the channel-shaped recesses 8 in a form-fitting manner by means of the applied vacuum.

The form-fitting vacuum application of the vacuum skin 12 as just described can be facilitated or enhanced by applying heat especially at selected critical locations to the vacuum skin 12, for example by means of a hot air or hot steam jet 20. The applied heat makes the vacuum skin 12 more easily deformable to ensure the tension-free form-fitting vacuum application of the vacuum skin 12 onto the profile member surface and into the sectional grooves 7 and the recesses 8. This is especially beneficial if the shape to be achieved is not merely a cylindrical curvature, but rather involves a spherical deformation and drawing of the vacuum skin 12, for example at crossing or intersecting locations of the profile member gaps or grooves 7. When the vacuum skin 12 consists of a polyamide, this deformation facilitating effect is especially enhanced by the use of a hot steam jet 20. Possible materials for the vacuum skin 12 include various polyamides, PTFE, ETFE, etc.

Figure 4:
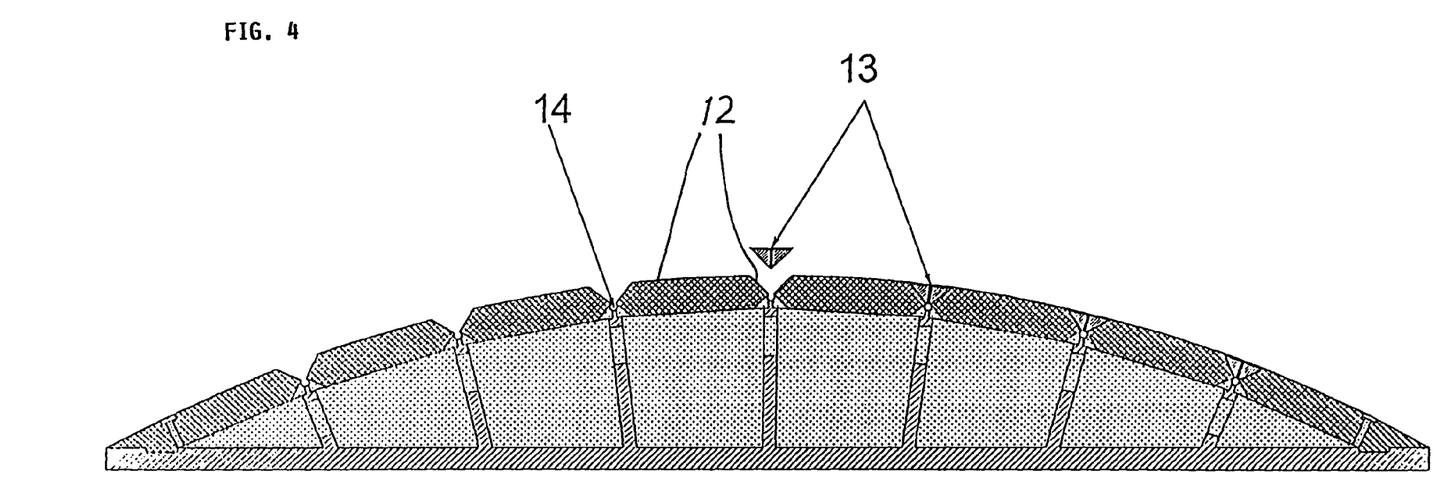
FIG. 4 shows a further subsequent process step in which stringer sectional members are positioned in grooves of the forming jig that have been covered by the vacuum skin.

In the next following step as shown in FIG. 4, a plurality of stringer sectional members 13 or preforms, respectively provided with support elements, for example made of light metal, hard foam, or silicone, are respectively laid into the sectional grooves 7 that have been covered by the vacuum skin 12. This forms recessed channels 14 in the channel-shaped recesses 8 that have been lined with the vacuum skin 12 and that are covered by the stringer sectional members 13. If the structural component is further or ultimately to be processed using an injection technique (e.g. DP-RTM, SLI, etc.) resin injection lines can be laid into the recessed channels 14 before being covered by the stringer sectional members 13.

Figure 5:
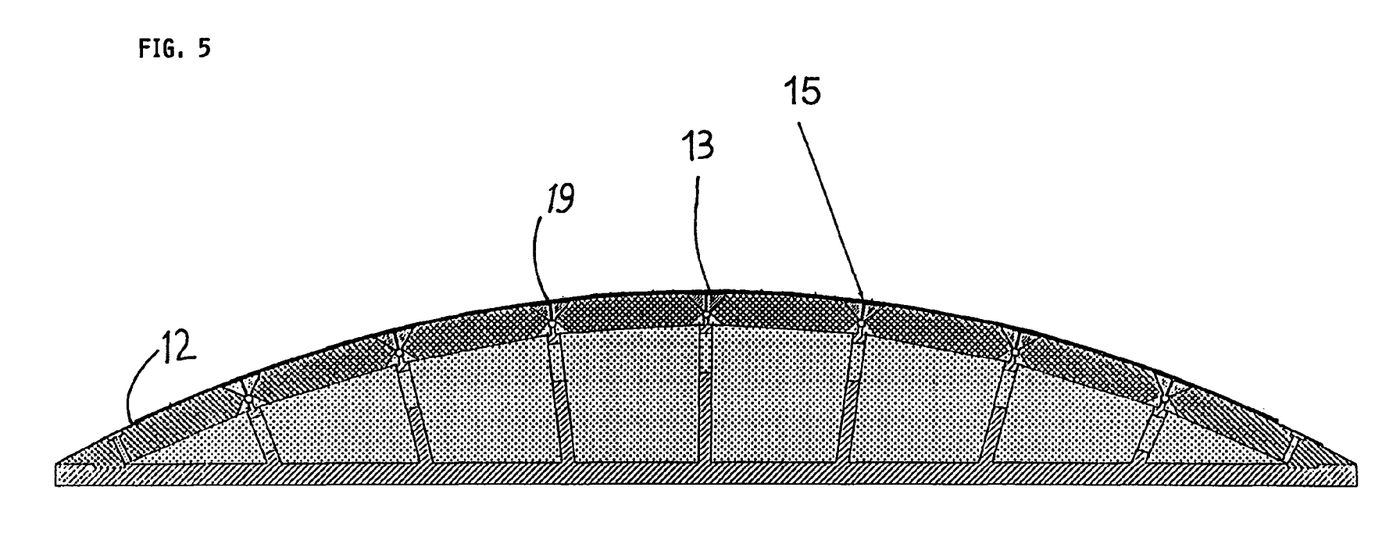
FIG. 5 shows a further subsequent process step in which skin layers are arranged on the stringer sectional members and on the vacuum skin that have been arranged on the forming jig.

FIG. 5 shows a next step in which all of the required skin layers 15 of reinforcing fibers or fiber composite materials are laid onto the vacuum skin 12 and the stringer sectional members 13.

At this point, if desired, the skin layers 15 can be secured to the stringer sectional members 13, for example by stitching 19 or the like.

Figure 6:
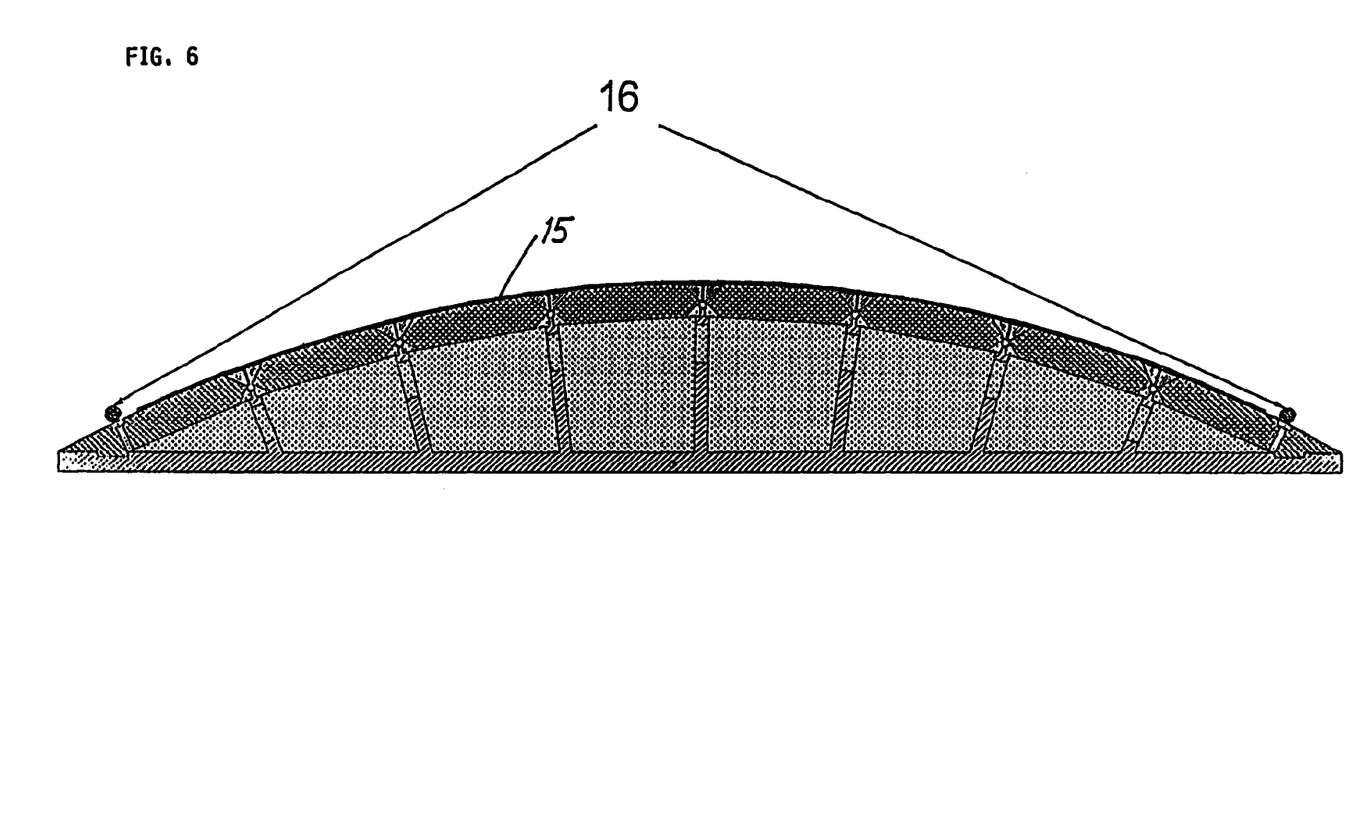
FIG. 6 shows a further subsequent process step in which a sealing mass is applied around the perimeter of the forming surface of the forming jig.

Next, as shown in FIG. 6, a sealing mass or sealant 16 (for example consisting of synthetic rubber or silicone) is applied in an optimal quantity to form a bead circumscribing the perimeter of the outer skin layer 15. This sealing mass 16 can be applied manually or in an automated step carried out by a robot.

Figure 7:
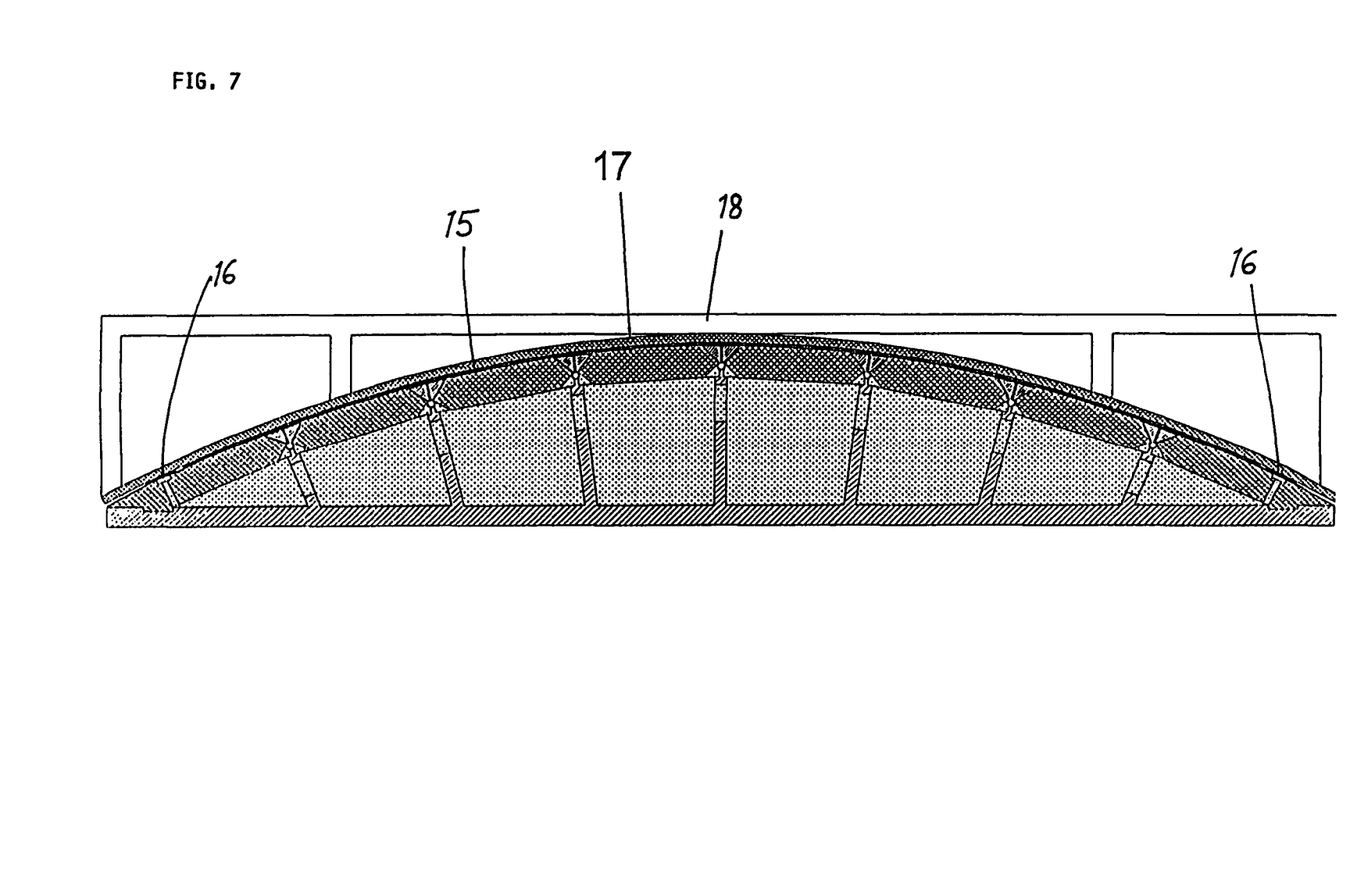
FIG. 7 shows a further subsequent process step in which a forming or molding tool carries a pre-formed structural shell and lays it onto the skin layers, with a vacuum applied to the cavity between the structural shell and the vacuum skin.

FIG. 7 shows the further successive step in which an "upside down" structural shell 17 (e.g. made of steel (nickel 36), aluminum or Al alloy, or composite), which has been turned over by 180° so that its concave curvature faces downward, is carried by a shell carrier and/or mold tool 18 and laid in a form-fitting manner onto the upper skin layer 15 and onto the circumscribing perimeter bead of the sealing mass 16. Thereby, the sealing mass 16 is pre-compressed to form a continuous vacuum-tight seal around the perimeter between the vacuum skin 12 and the structural shell 17. Furthermore, this forms an enclosed cavity containing the skin layers 15 between the vacuum skin 12 and the structural shell 17. Once the vacuum-tight sealing is achieved, the enclosed cavity is evacuated through the applied vacuum, for example by continuing or increasing the vacuum applied to the vacuum chamber formed by the interspaces 4 of the forming jig. Note that the vacuum skin 12 is vacuum-drawn to form a somewhat expanded channel 14 in each respective recess 8 as mentioned above.

Figure 8:
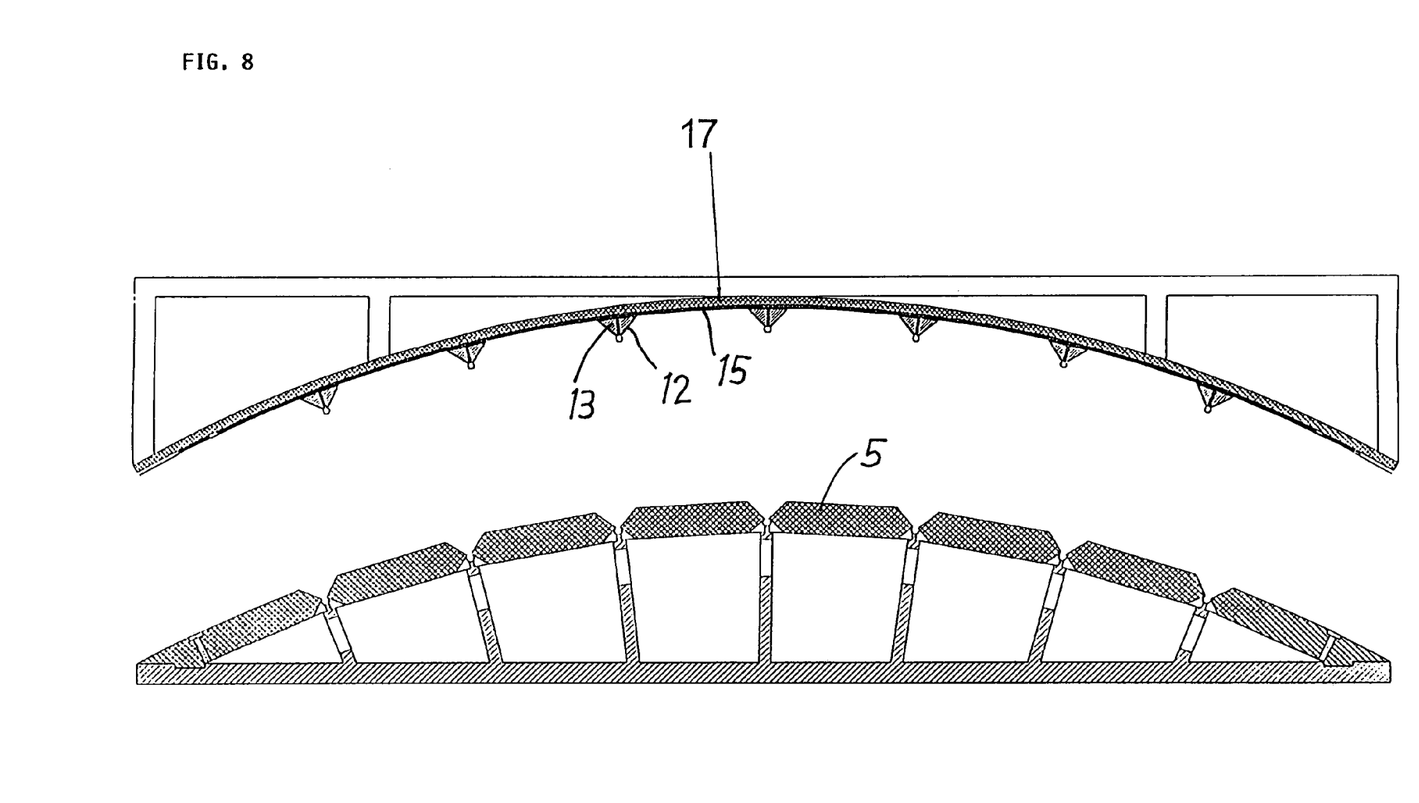
FIG. 8 shows a further subsequent process step, in which the vacuum is relieved, and the structural shell with the skin layers and stringer members bonded thereto is lifted from the forming jig.

After achieving the provided or intended degree of process vacuum in the enclosed cavity between the vacuum skin 12 and the structural shell 17, the vacuum in the hollow chamber formed by the interconnected interspaces 4 is discontinued and relieved, for example the hollow chamber is opened and vented to the atmosphere. Then, as shown in FIG. 8, the structural shell 17, with the skin layers 15, the stringer sectional members 13 and the vacuum skin 12 bonded thereto, is lifted up away from the modular sectional profile members 5 of the forming jig.

Figure 9:
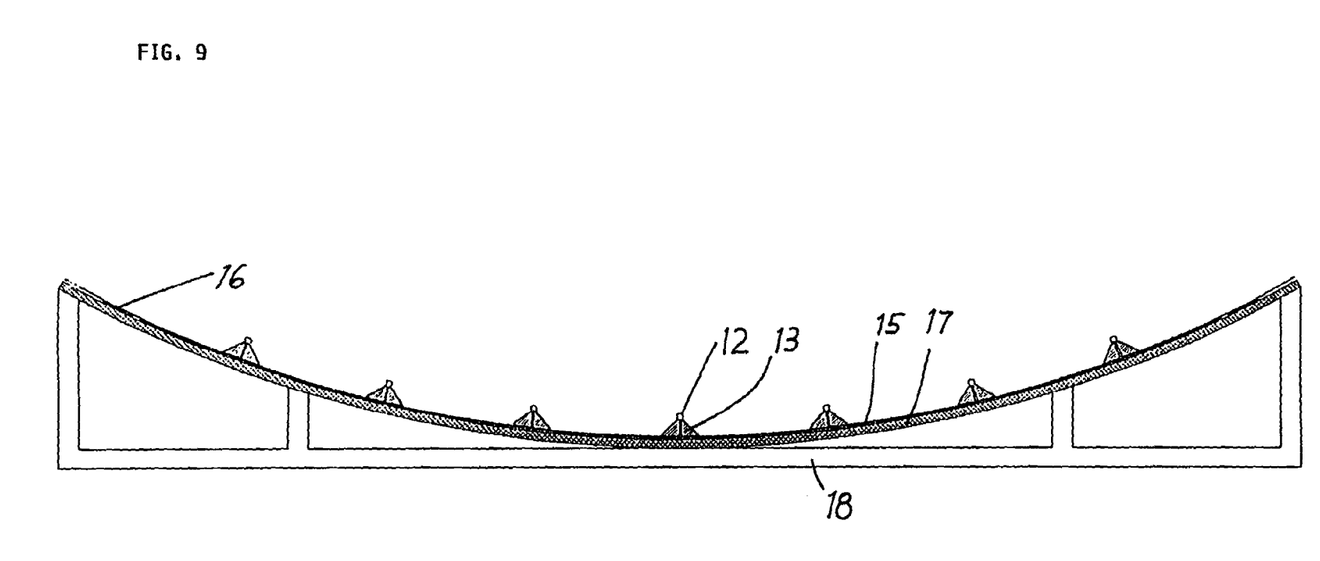
FIG. 9 shows a further subsequent process step, in which the structural shell is "flipped over" and then subjected to a resin injection and curing process in an autoclave under application of a process vacuum.

Then, as shown in FIG. 9, the structural shell 17 with the stringer members 13 bonded thereto, is once again turned over by 180° so that the concave curvature thereof faces upwardly. The thusly pre-formed and fabricated component is then subjected to a resin injection and curing process, for example, whereby the component including the structural shell 17, the skin layers 15, and the stringer members 13 is brought into an autoclave and subjected to a further process vacuum for carrying out the resin injection, further compaction, and curing. The above described method can be carried out entirely or substantially automatically, and especially without requiring manual positioning of the stringer members and the like. The accuracy of the positioning and alignment of the various elements is improved, the productivity is increased, the defect rate is reduced, and the consistent strength and reliability of the finished structural component is improved.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for automatable fabrication of an integral structural shell of a fiber reinforced composite material strengthened with stringers spaced apart from one another, using a forming jig that has a vacuum chamber therein and that has a forming surface with grooves therein and with air passages communicating from said grooves into said vacuum chamber, said method comprising the steps:

a) laying a film loosely onto said forming surface of said forming jig;

b) applying a vacuum to said vacuum chamber so that said vacuum is effective through at least said air passages to suck said film onto said forming surface;

c) after establishing a specified vacuum level of said vacuum, removing said film from said forming surface while simultaneously applying a vacuum skin onto said forming surface directly following said film as said film is removed, so that said vacuum skin is sucked form-fittingly onto said forming surface and into said grooves by said vacuum as said vacuum skin is applied onto said forming surface;

d) after said step c), laying stringer members into said grooves lined with said vacuum skin;

e) after said step d), laying plural skin layers comprising fiber material onto said vacuum skin and said stringer members;

f) applying a sealant onto said vacuum skin around a perimeter of said skin layers;

g) after said steps e) and f), laying a shell component onto said sealant and onto an uppermost one of said skin layers, whereby said sealant is compressed to form a vacuum-tight seal that circumscribes and closes a cavity between said vacuum skin and said shell component, wherein said cavity contains said skin layers and said stringer members therein, and said cavity is evacuated;

h) after said cavity is evacuated to a required vacuum level, then discontinuing said applying of said vacuum to said vacuum chamber and venting said vacuum chamber to the atmosphere outside of said forming jig;

i) removing said shell component, said skin layers, said stringer members, and said vacuum skin, which together form a preform for said integral structural shell, from said forming jig; and j) injecting resin into said preform unless said skin layers already contain resin, and curing said resin, to form said integral structural shell.

2. The method according to claim 1, wherein said forming jig further has a perimeter groove communicating into said vacuum chamber around a perimeter of said forming surface, and wherein said vacuum in said vacuum chamber is also applied through said perimeter groove.

3. The method according to claim 1, wherein, in said step c), said removing of said film comprises rolling-up said film onto a film roll, said applying of said vacuum skin comprises unrolling said vacuum skin from a vacuum skin supply roll, and said film roll and said vacuum skin supply roll are coupled to each other to roll along said forming surface together with one another and with said vacuum skin supply roll directly following said film roll.

4. The method according to claim 1, further comprising directing hot air or steam onto said vacuum skin during said step c) to facilitate a drawing and deformation of said vacuum skin form-fittingly onto said forming surface and into said grooves.

5. The method according to claim 1, further comprising, between said steps c) and d), an additional step of laying resin injection lines into said grooves lined with said vacuum skin.

6. The method according to claim 1, further comprising, after said step e), an additional step of stitching said plural skin layers onto said stringer members.

* * * * *